(12) United States Patent
Kuusisto et al.

(10) Patent No.: US 9,852,434 B2
(45) Date of Patent: Dec. 26, 2017

(54) METHOD, ARRANGEMENT, AND COMPUTER PROGRAM PRODUCT FOR COORDINATING VIDEO INFORMATION WITH OTHER MEASUREMENTS

(71) Applicant: Sensisto Oy, Espoo (FI)

(72) Inventors: Markus Kuusisto, Helsinki (FI); Jussi Sainio, Otalampi (FI)

(73) Assignee: SENSISTO OY, Espoo (FI)

( * ) Notice: Subject to any disclaimer, the term of this patent is extended or adjusted under 35 U.S.C. 154(b) by 672 days.

(21) Appl. No.: 14/486,444

(22) Filed: Sep. 15, 2014

(65) Prior Publication Data

US 2015/0006245 A1    Jan. 1, 2015

Related U.S. Application Data

(63) Continuation of application No. PCT/FI2013/050284, filed on Mar. 13, 2013.

(30) Foreign Application Priority Data

Mar. 14, 2012 (FI) ...................................... 20125277

(51) Int. Cl.
*G06K 9/36* (2006.01)
*G06Q 30/02* (2012.01)
(Continued)

(52) U.S. Cl.
CPC ..... *G06Q 30/0201* (2013.01); *G06K 9/00771* (2013.01); *G06Q 30/02* (2013.01);
(Continued)

(58) Field of Classification Search
None
See application file for complete search history.

(56) References Cited

U.S. PATENT DOCUMENTS 7,742,623 B1 *   6/2010   Moon ................ G06K 9/00228
                                                      382/103
8,965,042 B2 *   2/2015   Borger .................. G06Q 30/02
                                                      382/100

(Continued)

OTHER PUBLICATIONS

Cui J. et.al., "Multi-modal tracking of people using laser scanners and video camera", Image and Vision Computing 26 (2008) 240-252, abstract, Sections 2, 4, 7, Figs. 1,2,7.

(Continued)

*Primary Examiner* — Iman K Kholdebarin
(74) *Attorney, Agent, or Firm* — Young & Thompson (57) ABSTRACT

The pertinence of digital image material is analysed in respect of matching a given reference. A color of the reference constitutes a reference record in a perceptual color space. Pixels of a piece of digital image material are converted into the perceptual color space, and labelled according to how their converted pixel values belong to environments of principal colors in the perceptual color space. A connected set of pixels is selected that have at least one common label. A subset of the connected set of pixels is determined, so that the pixel(s) of the subset are those for which a color similarity distance to the reference record is at an extremity. For the connected set of pixels, a representative color is selected among or derived from the color or colors of the pixels that belong to the subset.

9 Claims, 8 Drawing Sheets (51) Int. Cl.
- *G06K 9/00* (2006.01)
- *G06T 11/60* (2006.01)
- *G06K 9/46* (2006.01)
- *G06K 9/20* (2006.01)

(52) U.S. Cl.
CPC ............ *G06T 11/60* (2013.01); *G06K 9/4671* (2013.01); *G06K 2009/2045* (2013.01)

(56) References Cited

U.S. PATENT DOCUMENTS

| | | | | |
|---|---|---|---|---|
| 9,076,212 | B2* | 7/2015 | Ernst | A61B 5/055 |
| 9,305,365 | B2* | 4/2016 | Lovberg | G06T 7/248 |
| 9,606,209 | B2* | 3/2017 | Ernst | G01R 33/56509 |
| 9,607,377 | B2* | 3/2017 | Lovberg | G06T 7/0012 |
| 2006/0010028 | A1* | 1/2006 | Sorensen | G06Q 30/02 705/7.34 |
| 2006/0200378 | A1* | 9/2006 | Sorensen | G06Q 10/063 705/7.29 |
| 2008/0117286 | A1* | 5/2008 | Cernasov | G06K 9/209 348/36 |
| 2008/0159634 | A1* | 7/2008 | Sharma | G06K 9/00771 382/224 |
| 2008/0198159 | A1* | 8/2008 | Liu | G08B 13/19641 345/420 |
| 2008/0278450 | A1* | 11/2008 | Lashina | G06F 3/0488 345/173 |
| 2010/0026802 | A1* | 2/2010 | Titus | G08B 13/19608 348/143 |
| 2010/0185487 | A1* | 7/2010 | Borger | G06Q 30/0201 705/7.29 |
| 2013/0003028 | A1* | 1/2013 | Lin | G02B 26/101 353/98 |
| 2014/0320408 | A1* | 10/2014 | Zagorsek | G06F 3/017 345/158 |
| 2015/0006245 | A1* | 1/2015 | Kuusisto | G06Q 30/02 705/7.29 |
| 2016/0350548 | A1* | 12/2016 | Lewis | G06F 21/6218 |
| 2017/0135179 | A1* | 5/2017 | Balazs | H04N 5/23238 |

OTHER PUBLICATIONS

Micheloni C. et.al., "Exploiting temporal statistics for events analysis and understanding", Image and Vision Computing 27 (2009) 1459-1469, abstract, Sections 2, 6.1, Figs. 1,6-7.

International Search Report, dated Jul. 4, 2013, from corresponding PCT application.

Finnish Search Report, dated Feb. 21, 2013, from corresponding PCT application.

* cited by examiner

(LASER HITS ARE COLLECTED)

METHOD, ARRANGEMENT, AND COMPUTER PROGRAM PRODUCT FOR COORDINATING VIDEO INFORMATION WITH OTHER MEASUREMENTS

TECHNICAL FIELD

The invention concerns in general the technology of providing visual feedback about observed activity at a target area. Especially the invention concerns the technology of processing visual images of the target area so that they can be correctly aligned and coordinated with results obtained with other measurement means.

TECHNICAL BACKGROUND

People who plan and set up displays and exhibitions of commercial products benefit from experimental data about how customers have been observed to react to and behave in front of previously available setups. As an example we may consider a large shelving in a supermarket or store, where a variety of products are available for customers to pick up. Although it is relatively easy to track the sales of different products e.g. from the automatically maintained data from cash registers, it would additionally be very interesting to know, how the customers behaved at the moment of actually selecting the products they wanted from the shelving.

Technical solutions exist that allow applying remote sensing techniques to detecting the behaviour of the customers. As an example, it is possible to use beams of infrared or other harmless, invisible radiation that cover a region through which the customers must reach to grab a product of interest. Detecting the blocking and/or reflections of such beams gives information about where did a hand of a customer appear and when. By using coordinates of detection locations it is possible to draw graphical illustrations of the results. However, the drawback of such illustrations is that they are not always very intuitive to read, and for the reader it may not be immediately clear, how did the detection locations correspond with the actual apperance of the target location in real life.

SUMMARY OF THE INVENTION

According to an aspect of the invention there is provided a method, an arrangement, and a computer program product that enable coordinating video information with other measurements so that the combined results can be presented to a human user with an intuitive way. Especially according to an aspect of the invention the coordination of video information with other measurements can be made automatically with small requirements of human intervention. According to an aspect of the invention the coordination of video information with other measurements could be easily repeatable in situations where a layout changes, or previous video information or previous measurements become obsolete. In this description, video information means information that can be represented in the form of images, i.e. still images, sequences of images, and video clips.

A method according to the invention is characterised by the features recited in the independent claim directed to a method.

An arrangement according to the invention is characterised by the features recited in the independent claim directed to an arrangement.

A computer program product according to the invention is characterised by the features recited in the independent claim directed to a computer program product.

Embodiments and advantageous implementations of the invention are discussed in the depending claims.

DETAILED DESCRIPTION OF EMBODIMENTS OF THE INVENTION

Figure 1:
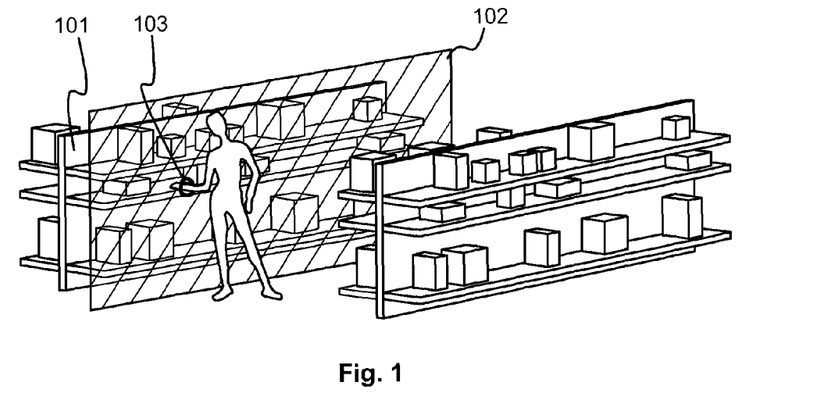
FIG. 1 illustrates a part of a store or supermarket.

FIG. 1 illustrates a part of a store or supermarket, which is one possible place where the invention could be utilized. Products for sale are on display on shelvings and/or racks, of which shelving 101 is shown as an example. For the shopkeeper, a question of interest is how customers behave when they select products from the shelving or rack. Especially the shopkeeper is interested in where are the "hot spots" that appear to attract more customer interest than other parts of the shelving. Likewise the shopkeeper may be interested in finding "blind spots" where very few, if any, customers seem to find anything of their interest.

Even if the products and shelvings constitute a naturally three-dimensional target area, in many cases it is possible to imagine an essentially two-dimensional target plane at the interface where the customer reaches for a particular product. In FIG. 1 such an imaginary target plane has been illustrated as 102. Instead of thinking, which part of the actual target area (the shelving 101) the customer reached to, we may think about the location 103 at which the customer reached through the target plane 102. Depending on the exact geometrical configuration we may say that the target plane is located within or adjacent to the target area. In order to maintain a good correlation between what is detected at the target plane 102 and what the customer touched within the target area it is advantageous to have the target plane as close to the target area as possible. As an example, if the target area is constituted by the shelving or rack and the products contained therein, the target plane 102 may be located a couple of centimetres in front of it.

Figure 2:
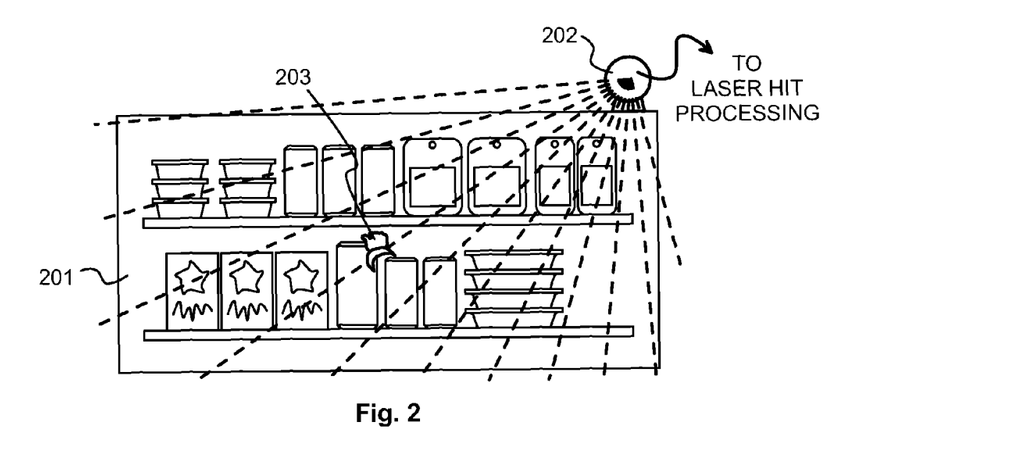
FIG. 2 illustrates a shelving equipped with a remote sensing apparatus.

The fact that the target plane is planar and two-dimensional greatly simplifies the task of remotely and unobtrusively detecting a human hand or other object that reaches through it. FIG. 2 illustrates a shelving 201, at one extremity of which a laser scanner 202 is installed. The laser scanner 202 emits one or more beams of infrared or other invisible, harmless radiation and uses a rotating mirror or corresponding arrangement to scan the beam(s) around in a plane. In this case the plane in which the scanning takes place sets up the target plane that as a concept was introduced above in FIG. 1. Although the laser beam has a finite thickness and thus very strictly speaking the scanning covers a three-dimensional slice of space, its thickness is so small compared to the other dimensions involved that it is customary to refer to it as a two-dimensional plane. The scanning movement has been illustrated by schematically showing the laser beam with dashed lines at a number of positions.

Whenever the beam hits something, the laser scanner 202 outputs the angle and distance at which a reflection occurred. For example if a hand 203 reaches far enough towards the products in the shelving 201, it is detected as giving rise to a number of laser hits. The angle and distance values indicate the location of each laser hit in a two-dimensional coordinate system that coincides with the target plane. Straightforward coordinate transformations exist that can be used to convert the angle and distance values into other kinds of two-dimensional coordinates, such as for example x-y-coordinates of a Cartesian coordinate system.

Figure 3:
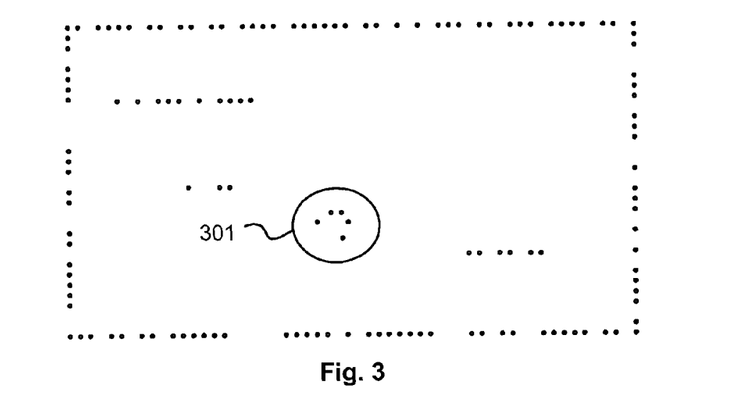
FIG. 3 illustrates detection results from a remote sensing apparatus.

FIG. 3 illustrates schematically a number of laser hits. A majority of them come from the floor, the ceiling, the walls, protruding shelf edges or products, or other fixed obstacles. However, at the location marked as 301 there are laser hits that came from the hand 203 in FIG. 2. A piece of laser hit processing software can be used to recognize, which laser hits appear to repeat in unchanged form in a number of scans. They can then be classified as "background" and omitted when detection of nonstationary or only temporarily appearing objects is attempted.

Although the laser hits can be plotted in a form like that of FIG. 3, which corresponds to the form of the target area (the shelving), the image remains relatively unintuitive when it does not have the visual appearance of the actual target area as background. For the shopkeeper it would be much more intuitive to see the laser hits (and/or any statistical data derived from them) against an image of the shelving as it was when the laser scanning measurements were made.

A laser scanner is not the only type of remote sensing apparatus that can be used. As an example of a multitude of other possibilities, a three-dimensional reflection analyser can be considered. This technology is particularly well known on the technical field of video games, where it is used for example in the Kinect® sensor of the Xbox® 360 gaming console. Kinect, Xbox, and Xbox 360 are registered trademarks of Microsoft Corporation. The three-dimensional reflection analyser projects a very large number of invisible infrared laser dots on all visible surfaces of a three-dimensional space. By measuring the reflections of the dots and observing their movement, the analyser is able to detect the locations and movements of objects within the observed area. A drawback of three-dimensional reflection analysers is that they typically require a calibration step in which the location of the sensor in relation to the dimensions of the space to be observed is measured and fed in manually.

Figure 4:
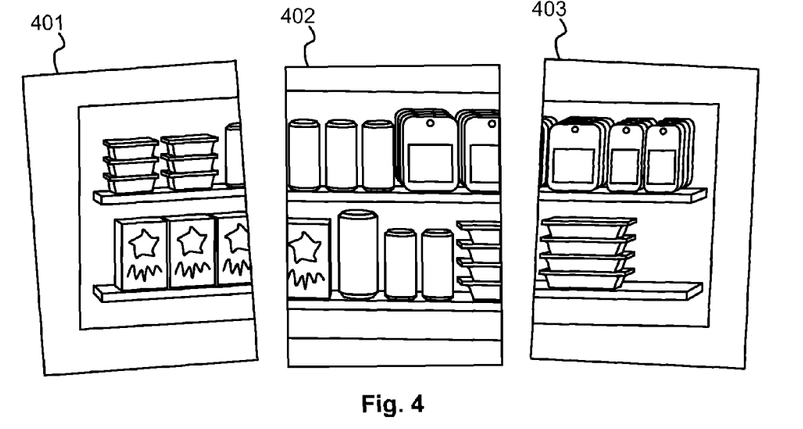
FIG. 4 illustrates a number of digital images.

The problem of producing an image of the shelving is illustrated schematically by FIG. 4. Shelvings, racks, freezer cabinets, and other structures that are used in shops to display products are typically relatively large; especially they may be relatively wide sideways. Additionally, typically the free space in front of them is relatively limited, so that a photographer seldom has the possibility of stepping far enough backwards to get the whole target area in his viewfinder simultaneously. Trying to get the target area covered with two or more photographs almost inevitably leads to the situation illustrated in FIG. 4, where the different exposures 401, 402, and 403 show parts of the target area in a variety of relative sizes, perspectives, and orientations, especially if the camera was held in hand and not on a tripod. Even if the photographer was diligent enough to use a tripod at constant height and distance from the target area, and to move a constant distance sideways between exposures, geometrical facts (i.e. perspective) and optical aberrations of the lens mean that the resulting digital images cannot be simply combined into a single panorama without causing artefacts that the human eye would perceive as irritating. Even more importantly, not combining the images properly might lead to a situation where the overlaid laser hit data would be interpreted incorrectly.

In some cases the whole target area fits into a single photograph, video frame, or other piece of digital image information. Even in that case the problem remains, how one should determine the mapping between laser hits and the digital image information so that the laser-assisted detection of appeared objects (such as the hands of shoppers) and their correlation with various parts of the target area could be appropriately illustrated.

Digital image processing algorithms exist that are capable of so-called stitching. They combine two or more digital images into a larger, panoramic image. However, applying some known stitching algorithms to produce a panoramic image from material like that illustrated in FIG. 4 has not produced satisfactory results. The reason is that a general-purpose stitching algorithm is meant to be used for outdoor views or otherwise subjects that are relatively far from the camera. In close-up images the changes in perspective between adjacent images are so large that a general-purpose stitching algorithm typically fails to find sufficient correspondence between different images on their overlapping zones. A general-purpose stitching algorithm also tries to produce a result that would appear as natural as possible for the human eye, whereas for the purposes of the present invention it is the good coordination of the image (or video) information with the other (laser scanning) measurements that is decisive. Problems have been observed especially in cases where the target plane that is set up by the laser scanner or other remote sensing apparatus lies in front of the actual products. There is nothing concrete there (because the laser beams only scan through empty air) that would come visible in the images, so the stitching algorithm that only works with what is seen in the images has in a way an incorrect starting point for correctly combining the images.

Figure 5:
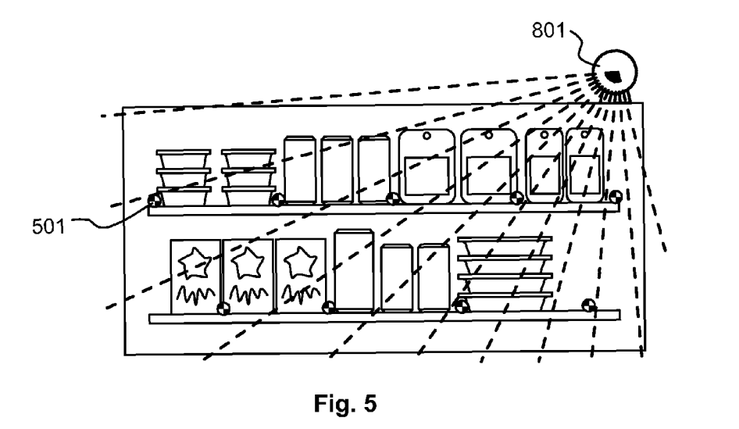
FIG. 5 illustrates the measuring of coordinates of reference targets.

FIG. 5 illustrates the principle of using reference targets. Here the reference targets appear as black and white circles; reference target 501 is shown as an example. A reference target is placed at at least two reference locations. In order to be detectable by the remote sensing apparatus, a reference target should have at least one part of it in the target plane that is located within or adjacent to the target area. In the arrangement of FIG. 5 the reference targets may be for example plastic or cardboard pegs or hangers that can be placed on a shelf and/or attached to hooks where products hang on display. An extending portion of such a peg or hanger reaches out from the target area and continues through the target plane that is located within or adjacent to the target area. It is not necessary to have all reference targets simultaneously in use. It is possible to use even a single reference target, which is placed at all desired locations in turn, so that eventually all desired locations will be covered. In some cases even the hand of an assistant can be used as a reference target.

Figure 6:
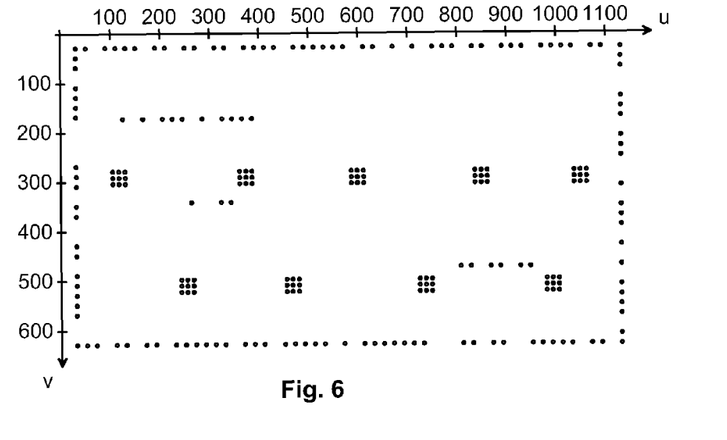
FIG. 6 illustrates detection results from an arrangement like that of FIG. 5.

FIG. 6 illustrates an example of how the reference targets of FIG. 5 become visible in a plot of the laser hits. Previously it was pointed out that a laser scanner gives the position of each hit as a pair of angle and distance values, or—after some processing—as some other coordinate values. Thus in general we may say that FIGS. 5 and 6 together illustrate measuring, with a remote sensing apparatus, coordinates of the reference target(s) at said reference location(s) in a two-dimensional coordinate system that coincides with the target plane. An example of a Cartesian u-v-coordinate system is shown; e.g. the coordinates of the reference target 501 are approximately (115, 290). To be quite exact, the use of a 3×3 dot matrix, as in FIG. 6, to illustrate the appearance of a reference target in a plot of laser hits may be somewhat misleading, because a linearly propagating laser never gives any hits from points that are directly beyond another hit point. The graphical illustration in FIG. 6 merely indicates that from each reference target, typically a good and easily recognizable hit or a cluster of closely located hits will be obtained.

Figure 7:
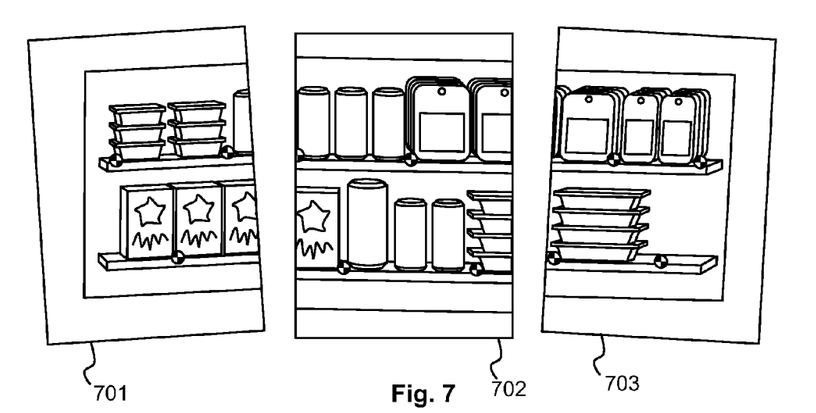
FIG. 7 illustrates a number of digital images with reference targets visible.

FIG. 7 illustrates providing at least two at least partially non-overlapping digital images 701, 702, and 703 of the target area, where the reference targets are now visible. Because of a reason that will become apparent in the following, now it does not matter even if there are differences in relative size, perspective, or orientation between the different images. They are defined as at least partially non-overlapping, because if two of the images would be completely overlapping so that one was completely covered by the other, the corresponding image information would be redundant. The idea of non-overlapping images is that together they can show a larger portion of the target area than any individual image alone.

A digital image consists of pixels arranged in rows and columns, and thus contains a natural Cartesian coordinate system of its own, in the form of a pixel count along two perpendicular directions. If the reference targets have a clearly detectable appearance in the images, an automatic software routine can be employed to detect the locations where the reference targets appear in said digital images, and to store these locations in the pixel count coordinate system of each corresponding digital image. Now a transformation can be applied, comprising at least one of linear transfer, rotation, scaling, and stretching in one or more directions, to the coordinate values in the pixel count coordinate system in order to make the coordinates of the locations where the reference targets appear to converge with the coordinates of the corresponding reference targets in the two-dimensional coordinate system where the detection results of the remote sensing apparatus are given.

Figure 8:
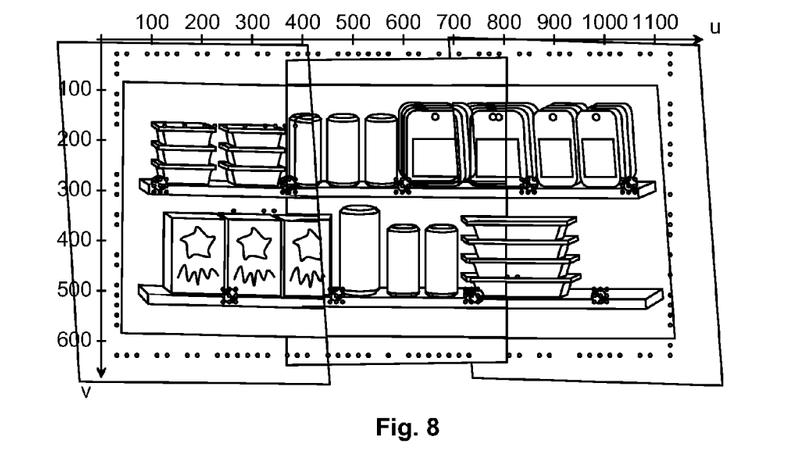
FIG. 8 illustrates combining modified images.

Typically the transformation (which comprises at least one of linear transfer, rotation, scaling, skewing, and stretching in one or more directions) is defined differently for each digital image, due to the differences in size, perspective, etc. between images. Applying the appropriate transformation to each image implements a kind of an intentional image distortion, modifying said digital images to make the coordinates of said reference targets in said digital images coincide with the (remote-sensing-) measured coordinates of the same reference targets at said reference locations. FIG. 8 illustrates schematically a result of modifying the digital images 701, 702, and 703 according to this principle. It can be seen that even if the illustrated contents of the modified images contain physically suspicious features in the deep of the image space (like mutually contradicting directions of the vanishing lines that define the perspective), at a plane that coincides with the target plane (which is in front of everything else that is seen in the images) the images go together reasonably well.

Figure 9:
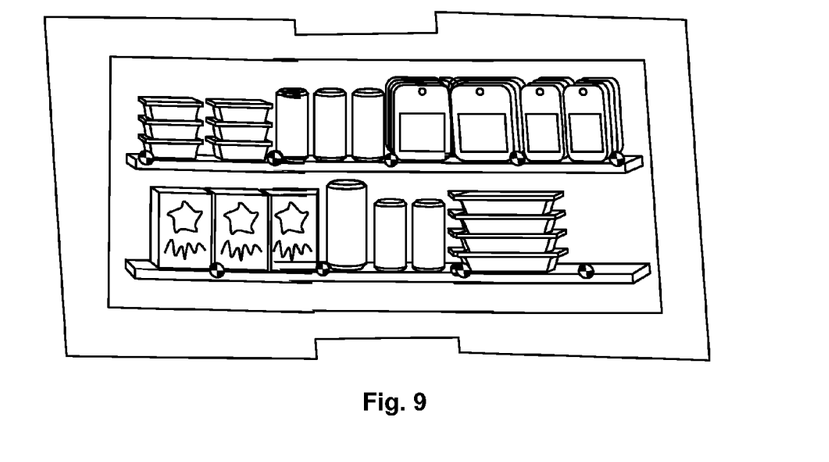
FIG. 9 illustrates a combination image.

A combination image can be output and stored, combined from the modified digital images. How the contents that end up in the combination image are selected on those areas where the modified images overlap, is not limited by the present invention. As an example, on the overlapping zones, one may select for a pixel of the combination image always the pixel value from that image in which that pixel is farther away from the edge of the image. As an alternative example, on the overlapping zone one may select always that pixel for which the smallest transformation from its original location in the original image had to be made. Yet another alternative is to use some kind of smoothing or filtering on the overlapping zones, so that the pixel values that end up in the combination image have some contribution from both of the overlapping original images. FIG. 9 illustrates schematically a combination image produced on the basis of combining the images as shown in FIG. 8.

Once the combination image has been produced, it can be used for plotting indications of detected objects that intersect the target plane using said combination image as background. If the same remote sensing apparatus is available that was used to measure the coordinates of the reference targets, it can be used to detect actual objects as well and to produce the indications of their detected locations with respect to the background image.

An advantageous way of plotting indications of detected objects with the combination image as background is to form a so-called heatmap, which uses colour codes to show an area as the "hotter", the more there have been object detections at or close that area. Thus, instead of illustrating individual detections, the heatmap is a way of displaying a distribution of object detections at different locations of the target plane using said combination image as background. In the following we describe an example of an embodiment in which, in addition to merely detecting objects, their dwelling times at detected stopping points within the target plane may be used as weights that determine the composition of the heatmap.

We assume that as a conceptual aid there exists a record space where records represent locations of the target plane. Any illustration of the target plane can be considered to consist of small, adjacent pixels, so that for each pixel there is a record in a record space. Records—that correspond to the determined stopping point locations of objects—may be weighted with values representative of object detections, or even the length of time each object was detected to stay at each respective discrete location. As more and more objects are observed and the as the weighting continues, those records begin to accumulate distinctively more weight that correspond to the most frequented stopping points. For example a laser scanner typically produces a row or bevy of laser hits at each object detection. It is advantageous to first preprocess the laser hits enough so that laser hits obviously representing a single object (judging by their sufficiently close appearance in space and time) are replaced with e.g. a center-of-mass point of those laser hits, representing the detected momentary location of the object.

Figure 10:
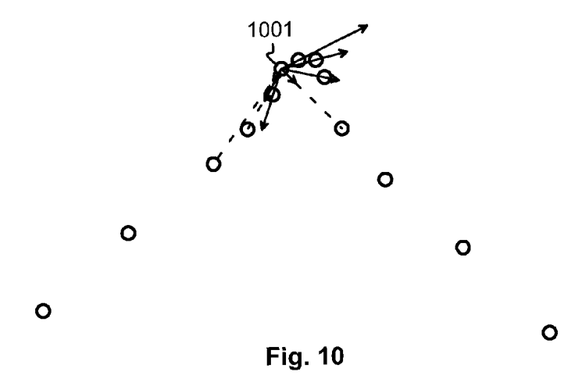
FIG. 10 illustrates a principle called the gravity-based method.

We assume that corresponding to each detected momentary location of the object, a location record is created that contains coordinates and time information. Location records should not be confused with the records of the record space discussed above. In order to find stopping points there is calculated, for at least a number of the location records, a location-record-specific descriptor value according to a "gravity-based" rule. The rule being "gravity-based" means that the rule makes the descriptor value the more significant the more densely there are other location records around the location record for which the descriptor value is currently calculated. FIG. 10 illustrates schematically the process of calculating the descriptor value for a location record illustrated as 1001. Each vector represents a pulling force that a unit mass located at 1001 would experience because of another unit mass located at a nearby detected location. Only the most significant vectors are shown in order to preserve graphical clarity. The location-record-specific descriptor value calculated for the location 1001 is then the scalar sum of all lengths of the vectors.

Mathematically we could say that the rule defines the calculation of said location-record-specific descriptor value as $$d_i = \sum_{\substack{j \in N_i \\ i \neq j}} \frac{G}{(D(i,j) + a_{min\square})^p}$$

where
$d_i$ means the location-record-specific descriptor value of an i:th location record,
i and j are indices that identify location records,
$N_i$ means an environment covering all location records around the i:th location record that are to be taken into account in calculating the location-record-specific descriptor value of an i:th location record,
G is a scalar constant,
D(i,j) is the distance between the i:th and j:th location records,
$a_{min}$ is a constant, and
p is a positive exponent.

Defining the environment $N_i$ is a practical way of limiting the amount of processing that needs to be done in calculating the location-record-specific descriptor values. It is of course possible to have $N_i$ cover all location records for all i, but since the significance of far-lying other location records may become very small (depending on the magnitude of the exponent p), the required processing can be significantly limited without losing very much accuracy by defining $N_i$ to cover for example only such other location records that according to their coordinates are closer than a predetermined limit to the i:th location record.

The scalar constant G does not have much significance, because it will appear similarly in all calculated location-record-specific descriptor values. Mainly it reminds of the gravity analogy; in order to fully resemble the calculation of gravitational interaction, the formula should include the gravity constant. The value of G could well be 1.

Calculating the distance between the i:th and j:th location records is made for example according to the formula $D(i,j) = \sqrt{(x_i - x_j)^2 + (y_i - y_j)^2}$ and $(x_j, y_j)$ are the two-dimensional Cartesian coordinates of the i:th and j:th location records respectively. The general notation D(i,j) covers all ways of expressing the (scalar) distance between the locations represented by the i:th and j:th location record.

The constant $a_{min}$ is a useful way of ensuring that for no value of j the corresponding term in the sum could go to infinity (which would happen if D(i,j)=0; i.e. if at the available accuracy the two detected locations would be the same). It introduces a certain minimum distance between the two locations. The value of $a_{min}$ is advantageously of the same order of magnitude as the estimated typical error in detecting the locations. If digital imaging is used for detection, the value of $a_{min}$ could be a small number of pixels. If a laser scanner is used for detection, the value of $a_{min}$ could be in the order of some millimetres or centimetres.

The magnitude of the exponent p essentially determines how quickly the effect of an other location record should die away as a function of increasing distance. For best analogy with gravity, one should select p=2, but the value of p could also be e.g. one or smaller than one, or between one and two, or larger than two. The larger value p has, the more the calculation of the descriptor value emphasizes only very close other location records. Concerning the detected movements of the object, a small value of p allows also less significant slow-downs to be detected as stops while a large value of p tends to limit the consideration to longer and more clearly outstanding stops.

The rule illustrated by the mathematical formula above gives the largest descriptor values as the most significant ones. It is naturally possible to present an alternative formula that would give the descriptor values so that the smallest of them is the most significant one, for example by summing only the powers of location differences $(D(i,j)+a_{min\square})^2$ instead of their inverses. By knowing what is the exact rule applied to calculating the descriptor values, it can be said which of the calculated descriptor values are the most significant ones. Selecting a location record that has the most significant descriptor value in its surroundings gives most likely stopping point of the object. For example in FIG. 10, the location illustrated by the left-hand one of the two topmost circles would most probably be selected as the stopping point.

Saying that the location-record-specific descriptor value is calculated at least for a number of all location records means that some selectivity may be applied for example when the number of location records is very large and they are located very densely along the detected trajectory of the object. In such a case it is in many cases perfectly acceptable to sacrifice some accuracy by only calculating the location-record-specific descriptor value for e.g. every second, every third, or every tenth location record.

Figure 11:
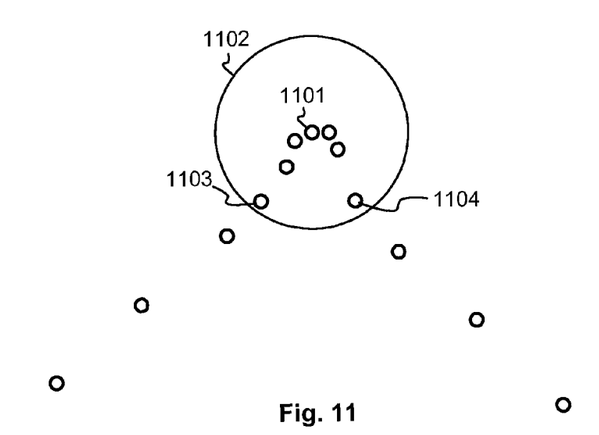
FIG. 11 illustrates a coordinate-based environment.

After having identified a stopping point, a representative time value should be found for telling, how long the object remained stationary or essentially stationary at or around the identified stopping point. FIG. 11 illustrates an exemplary way of doing this. From a coordinate-based environment of the location record that was selected (illustrated as 1101) there are found those other location records that according to their time information are the latest and earliest in said environment.

The coordinate-based environment is illustrated as the circle 1102 in FIG. 11. Being coordinate-based means that whether or not another location record belongs to that environment may be decided by investigating the coordinates of the other location records. If the coordinate-based environment of an i:th location record is a circle like in FIG. 11, the j:th location record belongs to that environment if the distance D(i,j) is smaller than the radius of the circle. In an analogous example, if the coordinate-based environment would be e.g. a rectangle centered on the detected stopping point, a comparison of coordinate values would reveal, whether some other location record belongs to that environment.

After all those location records have been found that belong to the coordinate-based environment 1102, the latest and earliest location record in that environment can be found by examining the time information contained in the location records. From the time information of the latest and earliest location record in the environment, a stopping time can be calculated. The most straightforward alternative is to just calculate the time difference between time stamps contained in the latest and earliest location records in the environment. If the time information has been expressed in some indirect way like as an ordinal number of a location record or as a reference to the number of a laser scan from which the location detection was made, slightly more advanced calculations may be needed. Additionally it is possible to process the time difference somehow, for example by only taking some representative fraction of the time difference as the stopping time, in order to account for the fact that the environment covered also points where the object was still moving or again moving.

According to an analysis result that can be output and stored, the object stopped at the coordinates of the selected location record for the stopping time that was calculated from the time information of said latest and earliest location records. How many other stopping points will be announced as analysis results, depends on what is required of the analysis. In some cases it is sufficient to only find the overall most significant descriptor value and use it to derive the results. In other cases it may be that for example all stops longer than a limit, say three seconds, should be revealed.

In the last-mentioned case one possible way to proceed is to go to the location-record-specific descriptor values, find the second most significant descriptor value (because the most significant one was considered already) and use the corresponding location record as a starting point for again placing a coordinate-based environment, finding the latest and earliest location record therein, and so forth. However, certain problems may arise because in many cases the location record with the second most significant descriptor value is very close to the first one, and actually belongs to the same stop of the object.

As an example, we may assume that the location record associated with the detected location 1101 in FIG. 11 had the overall most significant descriptor value among all location records. Since the emergence of that descriptor value was based on the close proximity of other detected locations, it is very much possible that the overall second most significant descriptor value will emerge for one of the detected locations immediately to the right or left from the detected location 1101, which also have very close neighbours.

In order to focus the search of another stopping point to somewhere else along the trajectory of the object after having selected the location record that has the most significant descriptor value in its surroundings, the method may comprise excluding from further selection location records that are closer than a limit value to the selected location record. Setting the limit value may follow the way in which the environment 1102 was defined, but this is not a binding requirement. However, it is a relatively logical choice, because as was noted above, the duration of time of the stop at detected location 1101 could be announced as equal to the time difference between the latest and earliest location record within the environment 1102. In other words, all location records within the environment 1102 could be made to logically belong to the stop at the detected location 1101, which would advocate excluding all of them from further selection.

Among the location records that remain not excluded, there can be repeated the steps of:
  selecting a (remaining) location record that has the most significant descriptor value in its surroundings,
  from a coordinate-based environment of the selected location record, finding those other location records that according to their time information are the latest and earliest in said environment, and
  outputting and storing (a further) analysis result, according to which said object stopped at the coordinates of the selected location record for a stopping time calculated from the time information of said latest and earliest location records.

The output and stored further analysis result thus indicates that the object also stopped at the coordinates of the location record that was selected in this repeated execution of the selection step.

Figure 12:
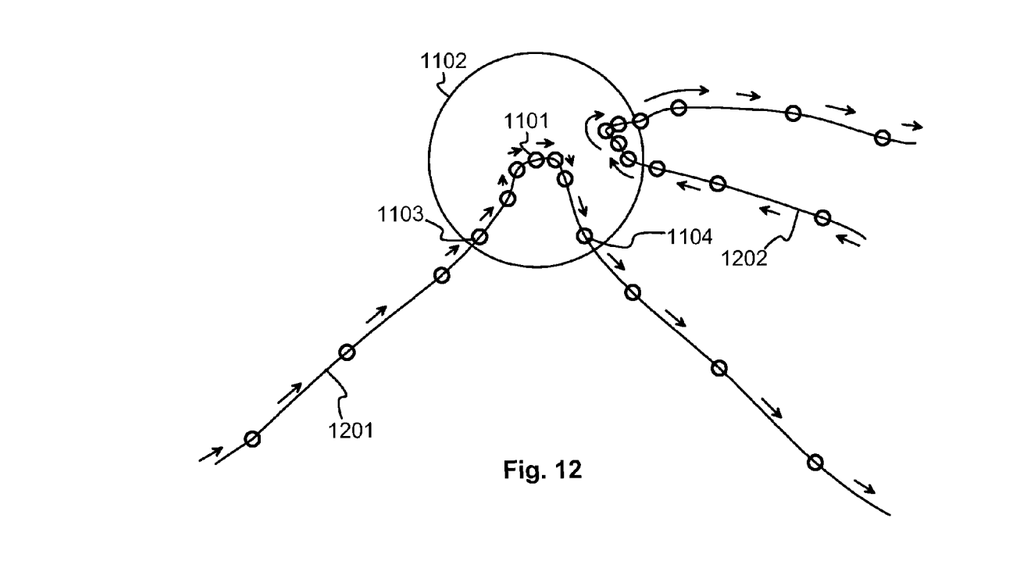
FIG. 12 illustrates the concept of revisiting an environment.

Some further considerations may apply if the object proceeds along a trajectory that revisits the environment of a stopping point. FIG. 12 illustrates a case in which the object first moved along what is illustrated as line 1201, and later moved along what is illustrated as line 1202. At detected location 1101 the object made a stop. In order to find out the time duration of the stop, a coordinate-based environment 1102 was considered. However, of all location records that happen to fall within the environment 1102, only those are eligible for finding the latest 1104 and earliest 1103 location record concerning the stop at 1101 for which a continuous sequence of temporally consecutive location records exists—within environment 1102—that connects them with the selected location record (the one associated with detected location 1101). In other words, even if all location records along the line 1202 are temporally later than the one associated with detected location 1104, none of them is eligible as the latest location record.

Since none of the location records along the line 1202 thus belongs to the stop that will be associated with detected location 1101, it is logical that when location records are then excluded from further selection, said excluding does not apply to location records within environment 1102 if time information of such location records reveals them to be either earlier than the earliest location record 1103 or later than the latest location record 1104. It is possible that a further significant stop of the object will be found at some of the detected locations along 1202, even if some of them are within the coordinate-based environment 1102 that applied to the stop at location 1101.

Whether or not the location records belonging to line 1202 are taken into account in calculating the descriptor values for the location records belonging to line 1201, is not limited. Both alternatives are possible. Allowing them to be taken into account results in more straightforward calculation of the descriptor values, because location records need not then be examined and discriminated on the basis of their time information. Also, if there was some reason for the object to later come back very close to a previous location, it may be only advantageous (for the purpose of finding the most relevant factors that affect the movements of the object) if the repeated visit makes the associated descriptor values more significant and increase the possibility of a stopping point being identified. However, in some cases allowing repeated visits to be taken into account in calculating the descriptor values may also result in a situation where a location will be identified as a stopping point even if the object actually never stopped there but only passed by a number of times.

If discrimination on the basis of time information is to be applied, it can be realized in many ways. For example, when calculating a descriptor value for a particular location record, one can simply take a time dimension into the definition of the environment $N_i$. That is, one may omit a j:th location record from the calculation of the descriptor value for the i:th location record if the time information of these two location records shows them to be more distant in time than a predetermined limit. Another possibility is to apply a similar "continuous sequence of temporally consecutive location records" type rule as above, including a j:th location record into the environment $N_i$ only if—in addition to the sufficiently short mutual distance in location—a continuous sequence of location records connects the two without going prohibitively far from the i:th location record at any point.

Figure 13:
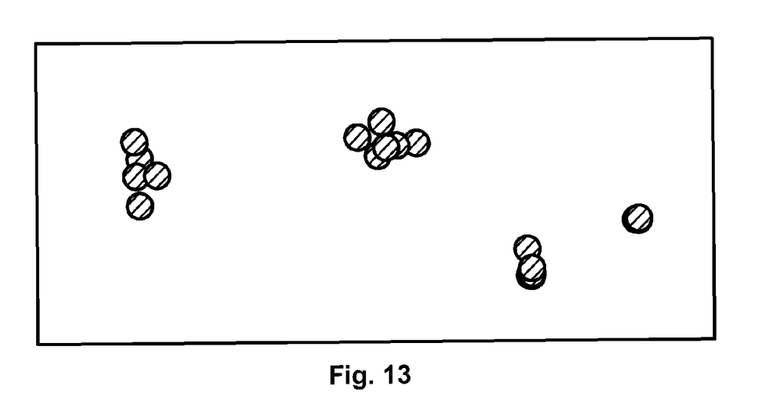
FIG. 13 illustrates detected stopping points of objects.

FIG. 13 illustrates schematically the observed stopping points of a number of objects drawn in a single image. In this case the stops of different objects seem to concentrate on particular locations. According to an aspect of the present invention, the existence and location of such apparently attractive areas should be visualized in a highly intuitive and practical manner, preferably so that a human user could use the visualization to easily convey not only their existence and location but also their relative importance and their location in relation to what was available on the target area at the time when the detections were made.

Figure 14:
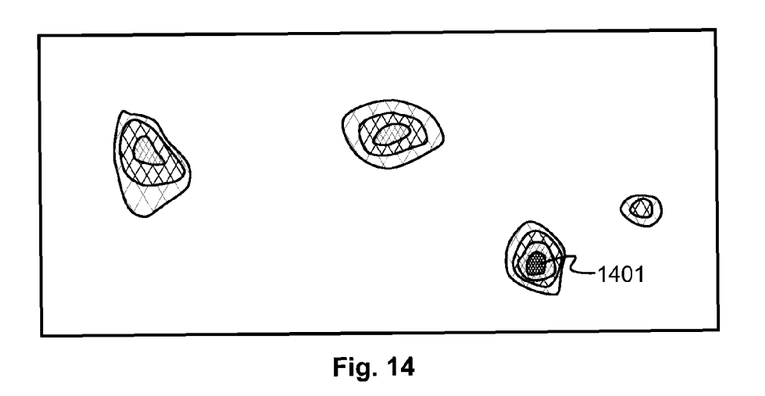
FIG. 14 illustrates a heatmap representation of detected stopping points of objects.

FIG. 14 illustrates the so-called "heatmap" style visual appearance that may be selected for the records of the record space. This means selecting for each record a color that appears to be the "hotter" the more weight the record has accumulated. This way the selected visual appearance becomes indicative of the accumulated weight of the respective record. In order to enable more intuitive illustration, it may be advantageous to make some kind of averaging between records close to each other, so that the selected visual appearance becomes indicative of the accumulated weight more in a vicinity of the respective record than at the exact record itself.

FIG. 14 thus illustrates how the weighted records of a record space corresponding to the target plane can be displayed as a simplified "heatmap". Here the selected visual appearance is not a color but a hatch, the intensity of which represents the corresponding "temperature". The selected visual appearances are used, and the records of said record space are displayed in a form that geometrically corresponds to the target plane. This is particularly simple in this case, when we remember that the target plane and the coordinate system applied to organise it were originally set up by the laser scanner or other remote sensing apparatus that also produces the detections from which the heatmap is derived. The "hottest" spot in FIG. 14 is the one referred to with number 1401, which provides a graphical illustration of the fact that essentially all objects were observed to stop there within a relatively small area, and also that the stops of the objects there were relatively long.

Figure 15:
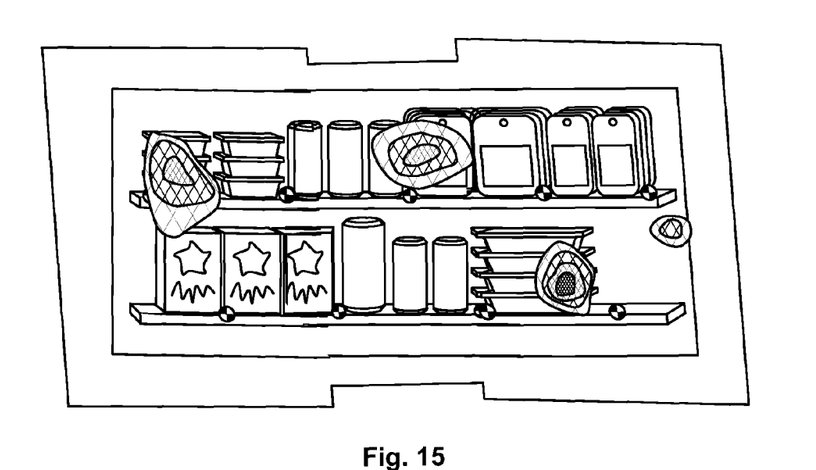
FIG. 15 illustrates the heatmap representation with the combination image as background.

FIG. 15 illustrates displaying the heatmap, i.e. a distribution of object detections at different locations of the target plane, using the combination image as background. Combining two digital images (the heatmap and the combination image) into one is a basic task of digital image processing and can be accomplished through methods that are known as such. Partial transparency can be added to the "temperature" indications of the heatmap so that the products or other parts of the target area behind them are still at least partially conceivable.

Figure 16:
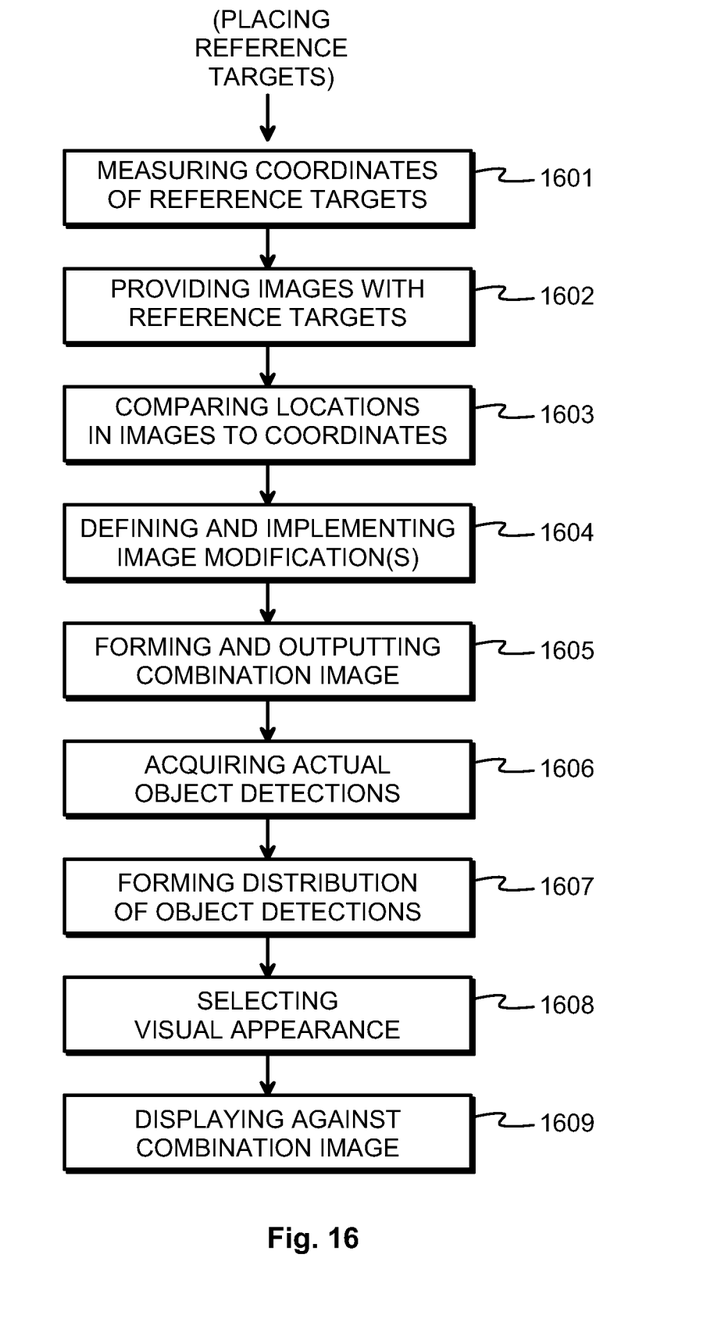
FIG. 16 illustrates a method and a computer program product according to an embodiment of the invention.

FIG. 16 illustrates schematically a method and a computer program product according to embodiments of the invention. The computer program product embodiment comprises one or more sequences of one or more instructions that, when executed by one or more processors, cause an apparatus to perform steps implementing a method in accordance with an aspect of the invention.

Prior to the execution of the method of FIG. 16 reference targets are placed so that they mark particular locations within the target area and extend at least partly through the target plane, so that they are available for detection by both a remote sensing apparatus that measures in the target plane and by a digital camera that sees the target area through the target plane.

Step 1601 comprises using the remote sensing apparatus to measure coordinates of the reference targets at at least two reference locations in the target plane. Previously it was already pointed out that the target plane is located within or adjacent to a target area. Step 1601 also comprises expressing the measured coordinates in a two-dimensional coordinate system that coincides with the target plane. If coordinate transformations are needed for example for changing from angular coordinates to Cartesian coordinates, they can also be implemented as a part of step 1601.

Step 1602 comprises providing at least two at least partially non-overlapping digital images of the target area. The images should be taken so that the reference targets are visible in the images. It is also advantageous if the images are taken from a direction that is essentially perpendicular against the target plane, because this helps avoiding geometric errors that could cause confusion in the positions of the reference targets with reference to the target area.

Step 1603 comprises detecting the locations where the reference targets appear in the digital images, and comparing these locations (in the image coordinate system) to the previously detected coordinates of the reference targets in order to be able to define the appropriate modification of the images. This step may take place completely automatically, if the image processing algorithm is clever enough to find the reference targets and to correctly associate each reference target in an image to the corresponding detection result. Alternatively some user interaction may be used, for example so that a detection image like that of FIG. 6 is shown to the user together with one or more images on a display, and the user is told to click on the point(s) in the image(s) that correspond(s) to a particular detected coordinates of each reference target in turn.

Step 1604 comprises defining the image modifications, and modifying the digital images to make the coordinates of the reference targets in the digital images coincide with the measured coordinates of the reference targets. Defining the image modifications can be made for example so that a number of equations are written that bind the coordinates of the reference targets in the images with their detected coordinates. Multipliers that indicate the amount of linear transfer, rotation, scaling, skewing, and/or stretching in one or more directions appear as unknowns in the equations. Solving the equations as a group of equations, typically using some optimization because no exact solution can be found, gives the multiplier values with which the image modifications can be made.

Step 1605 comprises outputting and storing a combination image that is combined from the modified digital images. This combination image can then be used as background or additional visualization for various ways of displaying statistical data about the observed behaviour of objects in the vicinity of the target area. For example, as is illustrated in steps 1606 to 1610, a heatmap representation of such statistical data can be given. It involves acquiring actual object detections at step 1606, typically using the same remote sensing apparatus that was used to measure the coordinates of the reference targets at step 1601. Distributions of the acquired object detections are formed at step 1607, for example by weighting records of a record space with values indicative of the length of stops that the objects were detected to make at various locations within the target plane. A visual appearance for the distributions is selected at step 1609, for example so that the higher the density (and/or the longer the detected stops) of object detections, the "hotter" color is selected. Step 1609 comprises plotting the indications of detected objects that cut the target plane using the selected visual appearances and using the combination image as background.

Figure 17:
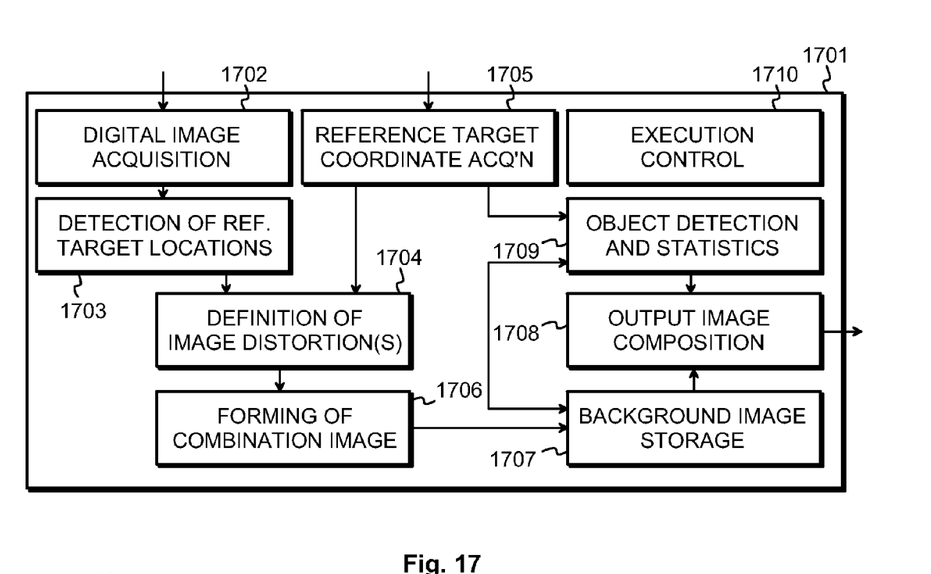
FIG. 17 illustrates an arrangement according to an embodiment of the invention.

FIG. 17 illustrates an arrangement according to an embodiment of the invention. The arrangement 1701 may be implemented as hardware alone, for example as an electric circuit, as a programmable or non-programmable processor, as a microcontroller, etc. The arrangement 1701 may have certain aspects implemented as software alone or can be implemented as a combination of hardware and software.

An entity that is schematically illustrated as the reference target coordinate acquisition block 1705 comprises at least a coordinate input that is configured to provide coordinates of reference targets. These are measured with a remote sensing apparatus, and represent the reference targets at at least two reference locations in a target plane that is located within or adjacent to a target area. The entity illustrated as block 1705 is also configured to express said coordinates in a two-dimensional coordinate system that coincides with said target plane. The reference target coordinate acquisition block 1705 may comprise a remote sensing apparatus such as a laser scanner, or a connection from one.

An entity that is schematically illustrated as the digital image acquisition block 1702 comprises an image input configured to provide at least two at least partially non-overlapping digital images of said target area. The digital image acquisition block 1702 may comprise for example a digital camera or a connection from one. Alternatively or additionally it may comprise a receiver for receiving digital image files from an external source, and/or a memory card reader configured to receive a portable memory from which the digital image files can be read.

Blocks 1703, 1704, and 1706 are labeled as the detection of reference target locations (in the digital images), the definition of image modifications, and the forming of a combination image respectively. They illustrate the fact that the arrangement comprises an image processor that is configured to detect the locations where the reference targets appear in said digital images and to modify said digital images to make the coordinates of said reference targets in said digital images coincide with the measured coordinates of said reference targets at said reference locations. Additionally the image processor is configured to use the modified images to form a combination image, where the modified images are stitched together at an image depth that corresponds to the target plane.

The entity labelled as the background image storage 1707 is an image storage configured to store a combination image combined from the modified digital images. The arrangement of FIG. 17 can be further used to obtain detections of actual objects within the target area and to provide illustrations of distributions of locations where such objects are detected. For this purpose there is an object detection and statistics entity 1709, which is advantageously coupled to receive the object detections from the same remote sensing apparatus that was used to detect the coordinates of the reference targets. The way in which the visual appearance of the data composed in entity 1709 is formed may be at least partly dependent on how the combination image looks like, for which purpose a connection is shown between entities 1707 and 1709. An output image composition entity 1708 is schematically shown for outputting images where the combination image is used as background for displaying the distributions of object detections. An execution control entity 1710 is shown that comprises the means for controlling the operation of the functionalities in the arrangement 1701.

The arrangement 1701 may be implemented using instructions that enable hardware functionality, for example, by using executable computer program instructions in a general-purpose or special-purpose processor that may be stored on a computer readable storage medium to be executed by such a processor. The arrangement may further comprise a memory as the computer readable storage medium the processor is configured to read from and write to. The memory may store a computer program comprising computer-executable instructions that control the operation of the arrangement 1701 when loaded into the processor. The processor is able to load and execute the computer program by reading the computer-executable instructions from memory.

While the processor and the memory are hereinbefore referred to as single components, the processor may comprise one or more processors or processing units and the memory may comprise one or more memories or memory units.

Reference to a processor or a processing unit should not be understood to encompass only programmable processors, but also dedicated circuits such as field-programmable gate arrays (FPGA), application specific circuits (ASIC), signal processors, etc.

Figure 18:
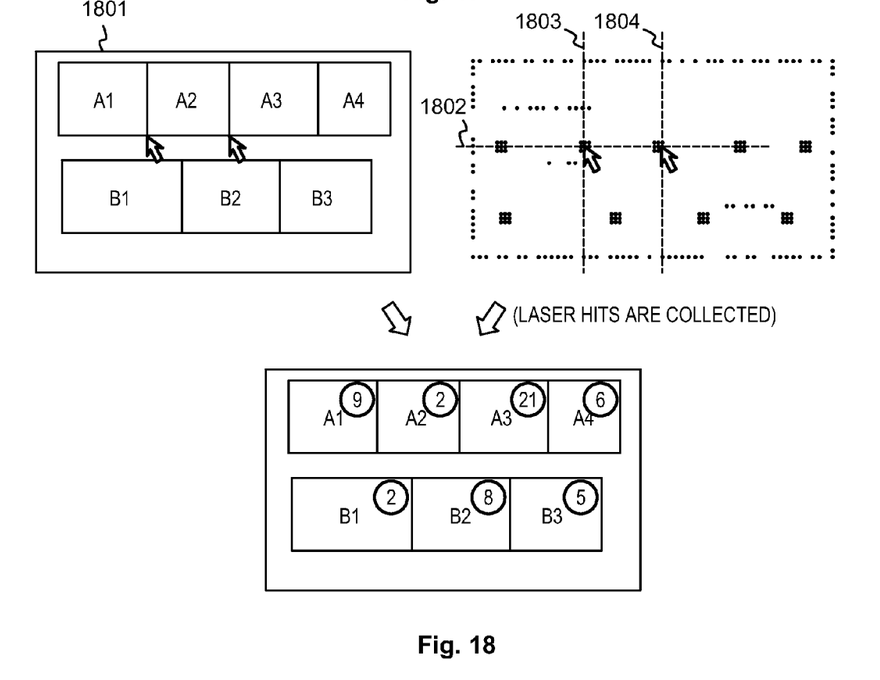
FIG. 18 illustrates the use of a schematic illustration.

FIG. 18 illustrates another possible way of coordinating video information with other measurements. Instead of photographs, the video information comprises a schematic diagram 1801 of the target area. Parts of the schematic diagram 1801 represent sections of the target area, for example so that part A2 represents the section where canned goods of a particular brand are on display. For the purposes of the invention it is not important, whether the geometric proportions of the schematic diagrams are correct or not, i.e. whether they correspond to the actual relative dimensions of the target area. In the illustrated example the reference targets are intentionally placed at the lower corners of the sections in the target area.

A mapping function is set up for correlating coordinates in the schematic diagram with coordinates in the coordinate system of the laser scanner. This can be accomplished for example by making a computer display both the schematic diagram and a plot of laser hits to a user, and asking the user to click on, tap on, or otherwise indicate points in the two that correspond to each other. As an example, FIG. 18 illustrates utilizing a mouse-controlled pointer (illustrated as a small arrow pointing up left) to click on the lower corners of part A2 in the schematic diagram and the laser hit groups that mark the reference targets placed at the lower corners of the particular section in the target area. This tells or "teaches" the computer that objects that will be detected above line 1802 in the vertical direction, and between lines 1803 and 1804 in the horizontal direction, belong to part A2.

After teaching is complete, the system may be left running so that it detects moving objects when they intersect the target plane. The mapping is utilized to classify the detected location of each object according to which part of the schematic diagram it appears to belong. The lower part of FIG. 18 illustrates a possible result after e.g. one shopping day. It is seen that the section of the shelving that corresponds to part A3 in the schematic diagram was by far the most popular, with 21 objects detected there during the day. To the contrary, the canned goods in the section corresponding to part A2 in the schematic diagram were relatively unpopular, with only 2 detected objects (i.e. the hand of a customer touching that section only 2 times during the day).

The schematic diagram 1801 can be made completely freely without exact reference to the actual outlook of the target area. As an alternative, the method described earlier in this description can be used to stitch a number of photographs of an actual target area into a panoramic image. That panoramic image can be displayed as a background on a screen, and the schematic diagram can be drawn as a "silhouette" on top of it, so that it becomes a relatively accurate representation of the actual target area. Using the schematic diagram as the base in which the numbers of detected objects will be announced involves an inherent advantage: the placing of products within the target area can be changed, without having to re-calibrate the detection system, as long as the new placing still obeys the same division into parts. For example, one may try moving the canned products of interest from part A2 to another part and examine during the following day, whether this had any effect on the relative number of object detections in those parts of the target area.

Figure 19:
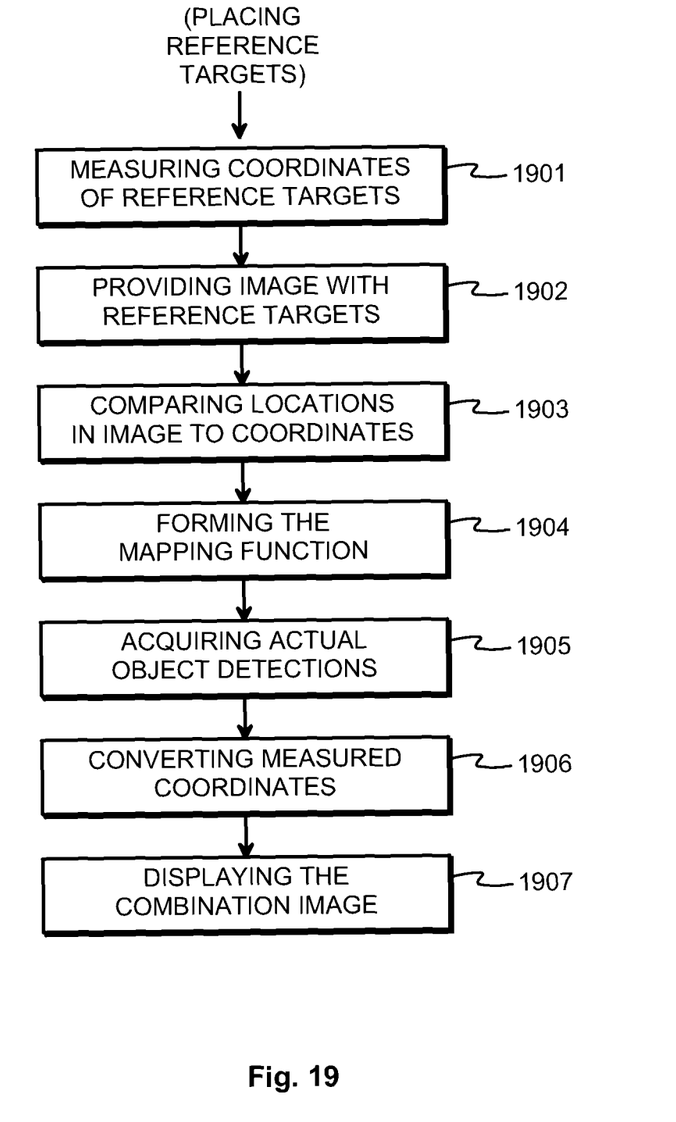
FIG. 19 illustrates a method and a computer program product according to another embodiment of the invention.

FIG. 19 illustrates a method and a computer program product for coordinating video information with other measurements in a case where the video information does not need the stitching phase that was discussed earlier. For example, the video information may come in the form of a schematic diagram like that discussed above in association with FIG. 8, or the target area may be compact enough to fit into a single photograph.

At step 1901 a remote sensing apparatus is used to measure coordinates of reference targets at at least two reference locations in a target plane that is located within or adjacent to the target area. The measured coordinates are expressed in a two-dimensional coordinate system that coincides with said target plane. As an example, the remote sensing apparatus may be a laser scanner, and the measured coordinates may be the angle and distance values that the laser scanner gives as its output. Coordinate transformations may be applied to convert the angle and distance values to Cartesian coordinates or other suitable coordinates.

Step 1902 represents providing a digital image of said target area, and detecting the locations where the reference targets appear in said digital image. In order to enable the execution of the method by a computer, detecting the locations may take place automatically (if the reference targets have an appearance that is readily recognizable by a pattern recognition algorithm), or it may involve displaying the digital image to a user and allowing the user to click on, tap on, or otherwise indicate the locations where the reference targets appear in the image. The last-mentioned alternative is applicable also in cases like that illustrated in FIG. 18, where the digital image is not a photographic image of the target area but has some more schematic form.

Steps 1903 and 1904 represent using the coordinates of said reference targets in said digital image and the measured coordinates of said reference targets at said reference locations to form a mapping function. This mapping function enables mapping measured coordinates in said target plane into coordinates in said digital image. Mapping may involve exact, point-to-point type mapping, in which a pair of measured coordinates in the target plane can be converted into an exact point in the digital image. However, the mapping may also have the form of classification, as was discussed earlier in association with FIG. 18. There all coordinates that in the target plane indicate a position above line 1802 and between lines 1803 and 1804 are mapped as belonging to part A2 in the digital image. A point-to-point type mapping function can be formed by writing the equation of a general, parameterized coordinate transformation, by forming a group of equations where each of the measured coordinates of the reference targets and the detected locations in the digital image appear in said equation in turn, and by solving the parameter values from said group of equations.

Step 1905 represents using the remote sensing apparatus to detect the appearance of objects that intersect said target plane and to output measured coordinates of detected objects. Thus at step 1905 the laser scanner or other remote sensing apparatus is used to detect the actual appearance of shoppers' hands, for example. Step 1906 represents using the above-mentioned mapping function to convert the measured coordinates of the detected objects into coordinates in the digital image. Step 1907 represents in general the process of outputting and storing a combination image, which contains location-bound indications of detected objects with the digital image. This process may involve statistical processing, which turns a large number of object detections into a "heat map", as has been described earlier. Another example of statistical processing is the formation of cumulative detection indicators, which were displayed at the lowest part of FIG. 18.

As with all embodiments of the invention, the results of the statistical processing need not be directly overlaid with the digital image; as an example, a schematic diagram like that of FIG. 18 could be displayed along with a histogram, pie chart, or other kind of graphical illustration that shows, next to the schematic diagram, the absolute and/or relative numbers of detections in each part of the schematic diagram.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments irrespective whether described or not.

The invention claimed is:

1. A method for coordinating video information with other measurements, comprising:
   measuring, with a remote sensing apparatus, coordinates of reference targets at at least two reference locations in a target plane that is located within or adjacent to a target area, wherein said remote sensing apparatus comprises one of a laser scanner and a three-dimensional reflection analyser,
   expressing said coordinates in a two-dimensional coordinate system that coincides with said target plane,
   providing at least two at least partially non-overlapping digital images of said target area, detecting the locations where the reference targets appear in said digital images, modifying said digital images to make the coordinates of said reference targets in said digital images coincide with the measured coordinates of said reference targets at said reference locations, outputting and storing a combination image combined from the modified digital images, and plotting indications of detected objects that cut the target plane using said combination image as background.

2. A method according to claim 1, wherein said objects are detected using the same remote sensing apparatus that was used to measure the coordinates of said reference targets.

3. A method according to claim 1, comprising displaying a distribution of object detections at different locations of the target plane using said combination image as background.

4. A method according to claim 3, comprising:
for a number of objects,
determining a number of discrete locations at which the object was detected to appear within the target plane, and
in a record space where records represent locations in the target plane, weighting records that correspond to the determined discrete locations with values representative of the length of time the object was detected to stay at each respective discrete location;
selecting a visual appearance for records of said record space, said visual appearance being indicative of the accumulated weight at or in a vicinity of the respective record, and
using the selected visual appearances, displaying records of said record space using said combination image as background.

5. A method for coordinating video information with other measurements, comprising:
measuring, with a remote sensing apparatus, coordinates of reference targets at at least two reference locations in a target plane that is located within or adjacent to a target area, wherein said remote sensing apparatus comprises one of a laser scanner and a three-dimensional reflection analyser,
expressing said coordinates in a two-dimensional coordinate system that coincides with said target plane,
providing a digital image of said target area,
detecting the locations where the reference targets appear in said digital image,
from the coordinates of said reference targets in said digital image and the measured coordinates of said reference targets at said reference locations, forming a mapping function that maps measured coordinates in said target plane into coordinates in said digital image,
using said remote sensing apparatus to detect the appearance of objects that intersect said target plane and to output measured coordinates of detected objects,
using said mapping function to convert said measured coordinates of said detected objects into coordinates in said digital image, and
outputting and storing a combination image containing location-bound indications of detected objects with said digital image.

6. An arrangement for coordinating video information with other measurements, comprising:
a coordinate input configured to provide coordinates of reference targets, measured with a remote sensing apparatus, at at least two reference locations in a target plane that is located within or adjacent to a target area, and configured to express said coordinates in a two-dimensional coordinate system that coincides with said target plane, wherein said coordinate input comprises a connection from one of a laser scanner and a three-dimensional reflection analyser,
an image input configured to provide at least two at least partially non-overlapping digital images of said target area,
an image processor configured to detect the locations where the reference targets appear in said digital images and to modify said digital images to make the coordinates of said reference targets in said digital images coincide with the measured coordinates of said reference targets at said reference locations, and
an image storage configured to store a combination image combined from the modified digital images,
wherein the image processor is further configured to plot indications of detected objects that cut the target plane using said combination image as background.

7. An arrangement for coordinating video information with other measurements, comprising:
a coordinate input configured to provide coordinates of reference targets, measured with a remote sensing apparatus, at at least two reference locations in a target plane that is located within or adjacent to a target area, and configured to express said coordinates in a two-dimensional coordinate system that coincides with said target plane, and wherein said coordinate input comprises a connection from one of a laser scanner and a three-dimensional reflection analyser
an image input configured to provide a digital image of said target area,
an image processor configured to detect the locations where the reference targets appear in said digital images and to form a mapping function from the coordinates of said reference targets in said digital image and the measured coordinates of said reference targets at said reference locations, said mapping function mapping measured coordinates in said target plane into coordinates in said digital image;
wherein said coordinate input is additionally configured to provide coordinates of objects, measured with said remote sensing apparatus, that intersect said target plane, and
wherein said image processor is additionally configured to use said mapping function to convert said measured coordinates of said detected objects into coordinates in said digital image, and
wherein the apparatus comprises an image storage configured to store a combination image containing location-bound indications of detected objects with said digital image.

8. A computer program product comprising machine-readable instructions that, when executed on a processor, are configured to cause the implementation of:
measuring, with a remote sensing apparatus, coordinates of reference targets at at least two reference locations in a target plane that is located within or adjacent to a target area, wherein said remote sensing apparatus comprises one of a laser scanner and a three-dimensional reflection analyser,
expressing said coordinates in a two-dimensional coordinate system that coincides with said target plane,
providing at least two at least partially non-overlapping digital images of said target area,
detecting the locations where the reference targets appear in said digital images, modifying said digital images to make the coordinates of said reference targets in said digital images coincide with the measured coordinates of said reference targets at said reference locations, outputting and storing a combination image combined from the modified digital images, and plotting indications of detected objects that cut the target plane using said combination image as background.

9. A computer program product comprising machine-readable instructions that, when executed on a processor, are configured to cause the implementation of:

measuring, with a remote sensing apparatus, coordinates of reference targets at at least two reference locations in a target plane that is located within or adjacent to a target area, wherein said remote sensing apparatus comprises one of a laser scanner and a three-dimensional reflection analyser, expressing said coordinates in a two-dimensional coordinate system that coincides with said target plane, providing a digital image of said target area, detecting the locations where the reference targets appear in said digital image, from the coordinates of said reference targets in said digital image and the measured coordinates of said reference targets at said reference locations, forming a mapping function that maps measured coordinates in said target plane into coordinates in said digital image, using said remote sensing apparatus to detect the appearance of objects that intersect said target plane and to output measured coordinates of detected objects, using said mapping function to convert said measured coordinates of said detected objects into coordinates in said digital image, and outputting and storing a combination image containing location-bound indications of detected objects with said digital image.

* * * * *